(12) United States Patent
Takekoshi

(10) Patent No.: US 11,697,404 B2
(45) Date of Patent: Jul. 11, 2023

(54) PARKING BRAKE CONTROL DEVICE

(71) Applicant: TOYODA IRON WORKS CO., LTD., Toyota (JP)

(72) Inventor: Kosuke Takekoshi, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 0 days.

(21) Appl. No.: 17/630,056

(22) PCT Filed: Jul. 22, 2020

(86) PCT No.: PCT/JP2020/028481
§ 371 (c)(1),
(2) Date: Jan. 25, 2022

(87) PCT Pub. No.: WO2021/015246
PCT Pub. Date: Jan. 28, 2021

(65) Prior Publication Data
US 2022/0274566 A1 Sep. 1, 2022

(30) Foreign Application Priority Data
Jul. 25, 2019 (JP) ................. 2019-137101

(51) Int. Cl.
*B60T 7/10* (2006.01)
(52) U.S. Cl.
CPC .................... *B60T 7/105* (2013.01)
(58) Field of Classification Search
CPC ........... B60T 7/105; B60T 7/104; B60T 7/102
See application file for complete search history.

(56) References Cited

U.S. PATENT DOCUMENTS 4,876,914 A * 10/1989 Kanno .................... B60T 7/105
74/543
9,823,682 B2 * 11/2017 Takeshima .............. B60T 7/105

FOREIGN PATENT DOCUMENTS

| JP | S59-065866 U | 5/1984 |
| JP | H11-105685 A | 4/1999 |

(Continued)

OTHER PUBLICATIONS

USPTO Machine Translation (retrieved from FIT database) of the Description of JP 2018043695 A, Oda et al., Mar. 22, 2018. (Year: 2022).*

(Continued)

*Primary Examiner* — Daniel D Yabut
(74) *Attorney, Agent, or Firm* — Oliff PLC

(57) ABSTRACT

A parking brake control device, including: a base attached to the vehicle body; a lever body rotatable with respect to the base and including a tubular handle portion; a ratchet gear formed on the base; a pawl rotatable with respect to the lever body and engaging with the ratchet gear to regulate rotation of the lever body; a release knob protruding from an end of the handle portion; a compression coil spring positioned inside the handle portion, the spring having a first end and a second end, wherein the compression coil spring at the first end urges the release knob outward of the handle portion; and a release rod inserted through the compression coil spring, with one end attached to the release knob, and another end connected to the pawl, wherein pushing in the release knob causes the release rod to rotate the pawl to disengage from the ratchet gear.

9 Claims, 6 Drawing Sheets

(56) References Cited

FOREIGN PATENT DOCUMENTS

| JP | 2018-043695 A | 3/2018 | | |
|---|---|---|---|---|
| WO | WO-2016080015 A1 | * | 5/2016 | ................ B60T 7/10 |
| WO | 2018/051560 A1 | | 3/2018 | |
| WO | WO-2018070068 A1 | * | 4/2018 | ................ B60T 7/10 |

OTHER PUBLICATIONS

USPTO Machine Translation (retrieved from FIT database) of the Description of WO 2018070068 A1, Matsubo et al., Apr. 19, 2018. (Year: 2022).*

Sep. 15, 2020 International Search Report issued in International Patent Application No. PCT/JP2020/028481.

Sep. 15, 2020 Written Opinion issued in International Patent Application No. PCT/JP2020/028481.

* cited by examiner

PARKING BRAKE CONTROL DEVICE

BACKGROUND

The present disclosure relates to a parking brake control device.

Various technologies related to the control device for applying or releasing a parking brake have been proposed. For example, Japanese Patent Application Publication No. 11-105685 describes a parking brake device having the release rod made of a plastic material. The release rod includes, proximate to the proximal end, a flexible bending section with a smaller circular cross section to be easily deflected. The proximal end of the release rod is integrally fastened to the pawl, which restrains movement of the proximal end of the release rod.

The middle section of the release rod is formed with an H-shaped cross-section in which lateral sides are recessed, and has a greater rigidity than the flexible section located proximate to the proximal end. The middle section of the release rod includes an upward protrusion in the upper surface, which is in an elastic contact with the inner wall of the arm portion of the parking lever. This elastic contact of the middle section of the release rod with the inner wall of the parking lever restrains movement of the middle section of the release rod. This reduces vibration of the release rod when the parking brake is not applied or when the vehicle is running, and thereby prevents generation of noise.

SUMMARY

The parking brake device described in the above publication may, however, be insufficient in the mechanical strength when the release rod is molded from a plastic material. When the release rod is made of a metal rod material with a circular cross-section in order to ensure the mechanical strength of the release rod, the forming of the middle section into a shape such as to contact the inner wall of the arm of the parking lever would result in an increased cost.

It is thus desired to provide a parking brake control device that can reduce vibration of the release rod at low cost and prevent the generation of noise while ensuring the mechanical strength of the release rod.

One aspect of the present disclosure is a parking brake control device, comprising: a base attached to the vehicle body; a lever body rotatable with respect to the base and comprising a tubular handle portion; a ratchet gear formed on the base; a pawl rotatable with respect to the lever body and engaging with the ratchet gear to regulate rotation of the lever body; a release knob protruding from an end of the handle portion; a compression coil spring positioned inside the handle portion, the spring having a first end and a second end, wherein the compression coil spring at the first end urges the release knob outward of the handle portion; and a release rod inserted through the compression coil spring, with one end attached to the release knob, and another end connected to the pawl, wherein pushing in the release knob causes the release rod to rotate the pawl to disengage from the ratchet gear, and wherein the compression coil spring presses at the second end against the side surface of the release rod.

In some embodiments, the lever body comprises a spring holding portion on the inner surface of the handle portion to support the second end of the compression coil spring; and the release rod comprises an offset section having a length in a position facing the spring holding portion, the offset section being offset in a direction away from the spring holding portion, and the compression coil spring presses at the second end against the side surface of the offset section of the release rod.

In some embodiments, the lever body comprises a pair of lever halves coupled together, the lever halves being divided in the rotation axis direction, one lever half comprising a first half-tube portion and the other lever half comprising a second half-tube portion, the first and second half-tube portion together forming part of the handle portion; the spring holding portion is formed on an inner surface of the first half-tube portion; and the offset section of the release rod is offset toward the second half-tube portion.

In some embodiments, the second half-tube portion comprises an inwardly protruding portion; and an intermediate section of the compression coil spring rests on the protruding portion.

In some embodiments, the release rod comprises a first flat surface portion in the side surface.

In some embodiments, the release rod further comprises a recessed second flat surface portion opposite to the first flat surface portion.

In some embodiments, the release rod further comprises two ridges in the side surface, and the compression coil spring presses against the release rod at the two ridges.

DETAILED DESCRIPTION

Different embodiments of the present disclosure will be described below in detail with reference to the drawings. The terms forward and rearward, left and right, and up and down, which are appropriately displayed in each drawing figure, indicate the direction with respect to the vehicle equipped with a parking brake control device. In the following descriptions, references to directions with regard to the parking brake control device will generally be made with respect to the vehicle.

[Configuration of the Control Device]

Figure 1:
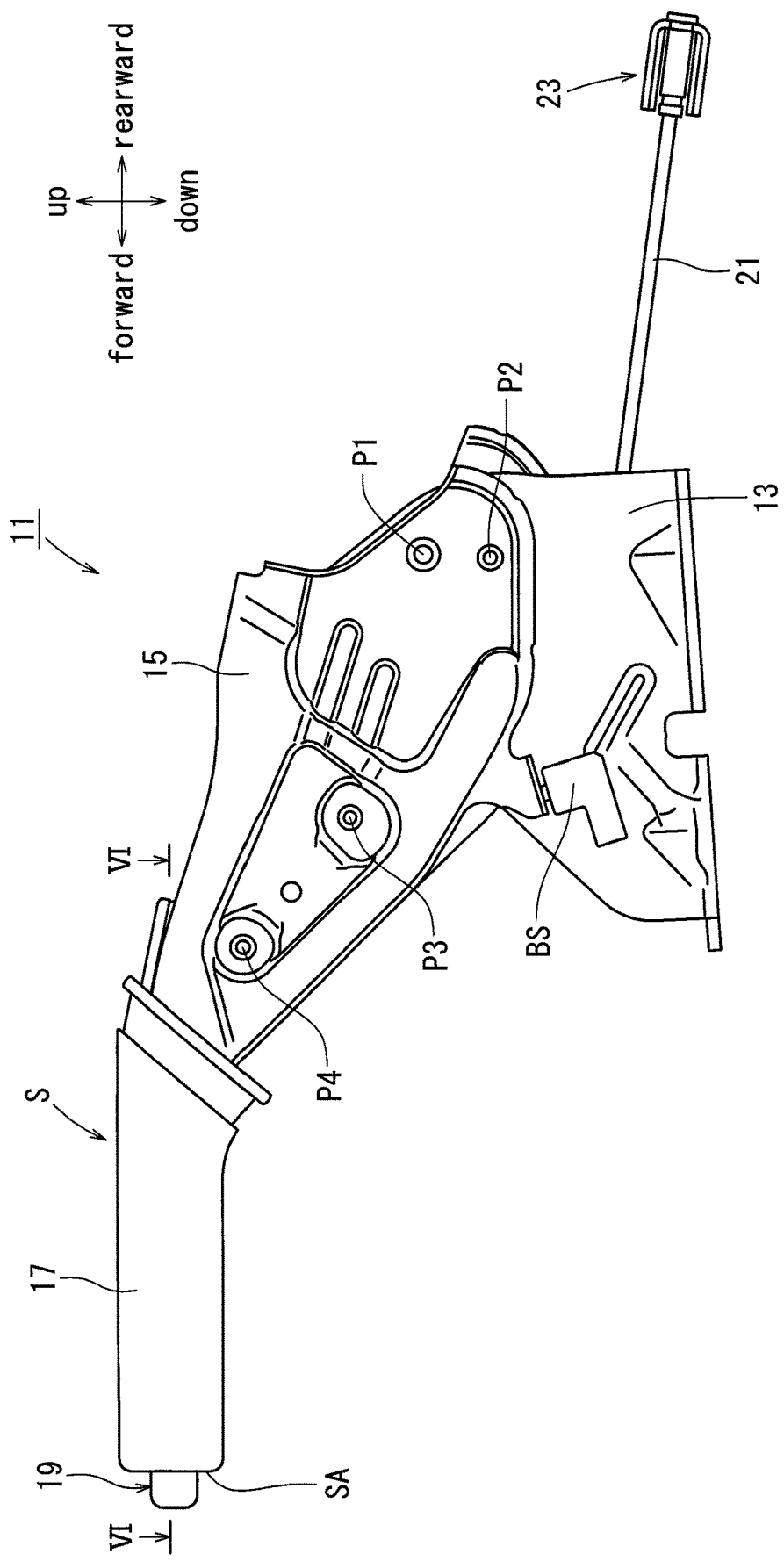
FIG. 1 is a side view of a parking brake control device, according to one embodiment.
Figure 2:
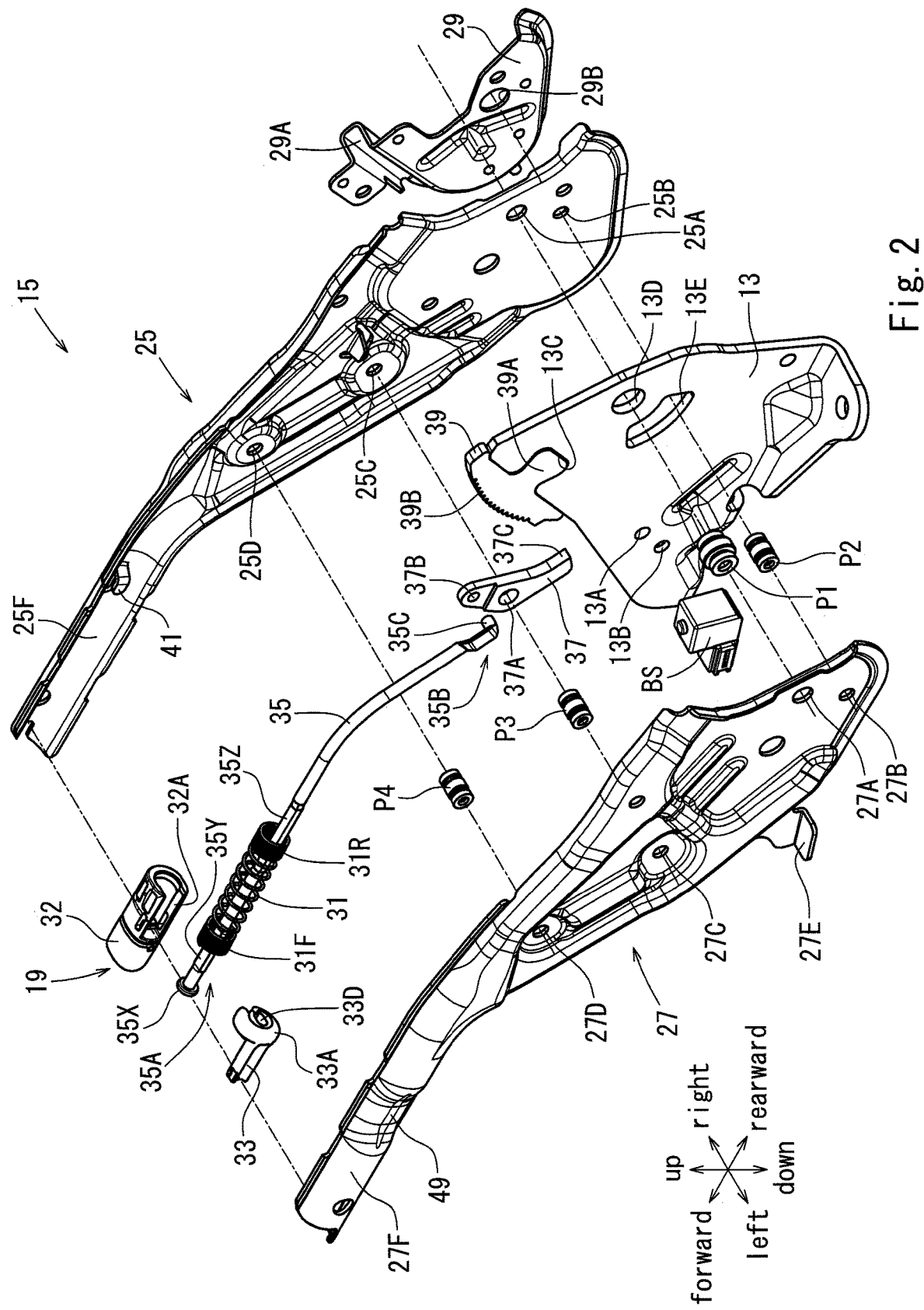
FIG. 2 is an exploded perspective view of a main part of a parking brake control device.

FIGS. 1 and 2 show a parking brake control device 11 according to a specific embodiment. The parking brake control device 11 may include a base 13, a lever body 15, a grip element 17, a release knob 19, a brake cable 21, an equalizer 23, and a parking brake switch BS.

The base 13 is a generally flat plate fixed to the floor of the vehicle body (not shown) in a substantially vertical position. A lever body 15 is rotatably supported on the base 13 by support pins P1 and P2. The forward portion of the lever body 15 is tubular, and the grip element 17 is fitted over the lever body 15. The forward portion of the lever body 15 and the grip element 17 form the handle portion S, which is gripped by the driver when the lever body 15 is rotated. The release knob 19 protrudes from its forward end SA of the handle portion S for unlocking the rotation of the lever body 15. The release knob 19 may have, for example, a generally circular cross section, elongate in the forward-rearward direction. The release knob 19 may have a flat end surface, or a slant end surface inclined with respect to its axis (a slant knob).

The forward end of the brake cable 21 is connected to the lever body 15 through a cable guide 29 (see FIG. 2), which will be described later. The rearward end of the brake cable 21 is connected to the equalizer 23. The brake cable 21 can then transmit the rotational control force exerted on the lever body 15 to the equalizer 23. The equalizer 23 transmits the tension on the brake cable 21 equally to the left and right wheel brakes (not shown) of the vehicle. The driver can rotate the lever body 15 clockwise or counterclockwise as seen in FIG. 1 to apply or release the left and right wheel brakes (not shown) of the vehicle.

The parking brake switch BS detects, according to its on/off contact states, whether the left and right wheel brakes (not shown) of the vehicle are in the applied state or not. Reference symbols P3 and P4 indicate support pins.

[Half-Split Configuration of the Lever]

As shown in FIG. 2, the lever body 15, made of a metal plate, may be composed of a first lever half 25 and a second lever half 27. The first lever half 25 and the second lever half 27 each have half-tube portions 25F and 27F with an arcuate cross section, which, when combined, form a handle portion S in the forward portion of the lever body 15. The first lever half 25 includes pin holes 25A, 25B, 25C, 25D. The second lever half 27 includes pin holes 27A, 27B, 27C, 27D as well as a flange 27E.

[Cable Installation]

The cable guide 29 includes a cable channel 29A on the left (or inner) side along the forward edge. The left side (or inner) surface of the cable guide 29 faces the right side (or outer) surface of the first lever half 25 and is welded to the right side (or inner) surface of the first lever half 25. By this welding, a lower end opening in communication with the cable channel 29A is formed at the forward lower end of the cable guide 29. At the same time, an upper end opening in communication with the cable channel 29A is formed at the forward upper end of the cable guide 29.

The forward end of the brake cable 21 (see FIG. 1) is inserted from below into the lower end opening formed at the forward lower end of the cable guide 29, and the forward end of the brake cable 21 is fastened at the upper end opening formed at the forward upper end of the cable guide 29. The forward end of the brake cable 21 is thus connected to the lever body 15.

[Detailed Configuration of the Control Device]

The control device 11 further includes, between the first lever half 25 and the second lever half 27 that form the lever body 15, a compression coil spring 31, a release rod 35, a pawl 37, and a ratchet gear 39. The ratchet gear 39 is sometimes called a "sector".

The compression coil spring 31 urges the release knob 19 forward. The ratchet gear 39 is a generally flat plate which includes a protrusion 39A and a teeth 39B. The pawl 37 includes at the lower end a claw portion 37C, which engages the teeth 39B of the ratchet gear 39.

The base 13 includes a pair of fixing through-holes 13A, 13B, a notch 13C, a pivot pin hole 13D, and a guide pin hole 13E. The parking brake switch BS is fixed to the base 13 by screwing a pair of screws (not shown) through the fixing through-holes 13A, 13B into the parking brake switch BS. The protrusion 39A of the ratchet gear 39 is clinched into the notch 13C, and the ratchet gear 39 is thereby fixed to the base 13.

[Rotatable Support for the Lever Body]

The support pin P1 is fitted into the pivot pin hole 13D. The right end of the support pin P1 has an outer diameter smaller than that of the middle of the length and thus includes a step. The right end of the support pin P1 is inserted in the pin hole 27A in the first lever half 25, and clinched on the right (or outer) side of the first lever half 25. The left end of the support pin P1 has an outer diameter smaller than that of the middle of the length and thus includes a step. The left end of the support pin P1 is inserted in the pin hole 27A in the second lever half 27, and clinched on the left (or outer) side of the second lever half 27.

The guide pin hole 13E is formed in the shape of a circular arc centered on the rotation pin hole 13D. The support pin P2 is fitted in the guide pin hole 13E. The right end of the support pin P2 has an outer diameter smaller than that of the middle of the length and thus includes a step. The right end of the support pin P2 is inserted in the pin hole 25B in the first lever half 25, and clinched on the right (or outer) side of the first lever half 25 within the circumvention hole 29B in the cable guide 29. The left end of the support pin P2 has an outer diameter smaller than that of the middle of the length and thus includes a step. The left end of the support pin P2 is inserted in the pin hole 27B in the second lever half 27, and clinched on the left (or outer) side of the second lever half 27.

The lever body 15 composed of the first lever half 25 and the second lever half 27 is thus rotatably supported on the base 13 by the support pins P1, P2. The support pin P1 serves as a pivot or support shaft for the lever body 15.

[Pivotable Support for the Pawl]

The pawl 37 is pivotably supported on the lever body 15 composed of the first lever half 25 and the second lever half 27 by the support pin P3. For this purpose, the support pin P3 is inserted in the pivot pin hole 37A formed substantially in the middle of the pawl 37. The right end of the support pin P3 has an outer diameter smaller than that of the middle of the length and thus includes a step. The right end of the support pin P3 is inserted in the pin hole 25C in the first lever half 25, and clinched on the right (or outer) side of the first lever half 25. The left end of the support pin P3 has an outer diameter smaller than that of the middle of the length and thus includes a step. The left end of the support pin P3 is inserted in the pin hole 27C in the second lever half 27, and clinched on the left (or outer) side of the second lever half 27. The support pin P3 serves as a rotation shaft for the pawl 37.

[Joining the Lever Halves]

The support pin P4 couples the first lever half 25 and the second lever half 27 together. For this purpose, the right end of the support pin P4 has an outer diameter smaller than that of the middle of the length and thus includes a step. The right end of the support pin P4 is inserted in the pin hole 25D in the first lever half 25, and clinched on the right (or outer) side of the first lever half 25. The left end of the support pin P4 has an outer diameter smaller than that of the middle of the length and thus includes a step. The left end of the support pin P4 is inserted in the pin hole 27D in the second lever half 27, and clinched on the left (or outer) side of the second lever half 27.

The support pins P1, P2, P3 also couple together the first lever half 25 and the second lever half 27 which form the lever body 15.

When the first lever half 25 and the second lever half 27 are thus coupled, the compression coil spring 31, the release rod 35, the pawl 37, and the ratchet gear 39 are kept inside the lever body 15.

[Operation of the Switch]

Once the first lever half 25 and the second lever half 27 are coupled, rotation of the lever body 15 causes the flange 27E of the second lever half 27 to press and separate from the contact portion of the parking brake switch BS to thereby switch it between the on and off states.

[Configuration of the Knob]

As shown in FIG. 2, the release knob 19 may include, for example, a knob element 32 having an receptacle portion 32A receiving the forward end 35A of the release rod 35, and a closure 33 closing the opening of the receptacle portion 32A to hold the forward end 35A of the release rod 35. The rearward surface of the closure 33 includes a spring receiving portion 33A.

[Release Rod]

Figure 3:
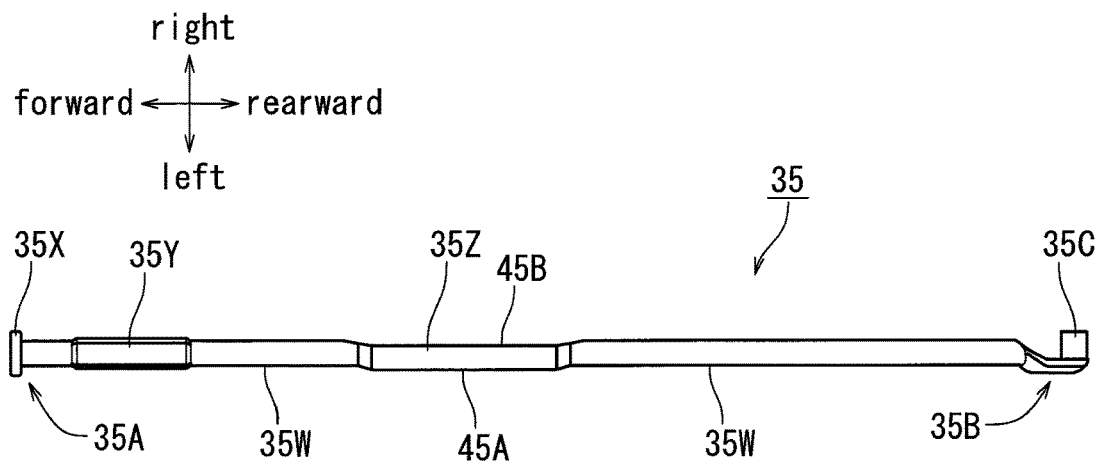
FIG. 3 is a plan view of the release rod.
Figure 4:
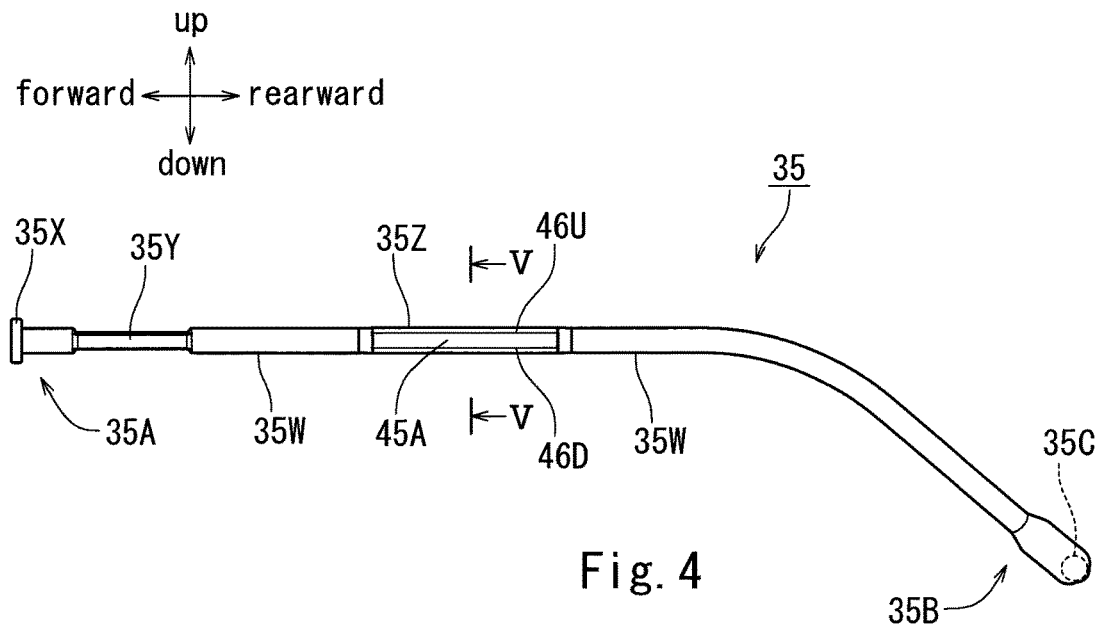
FIG. 4 is a side view of the release rod.

As shown in FIGS. 2 to 4, the release rod 35 is a metal rod made of, for example, iron or stainless steel with a generally circular cross section. The forward end 35A of the release rod 35 includes a retaining portion 35X formed by, for example, forging the forward end, into the shape of a disk that protrudes radially outward. The release rod 35 extends in the forward-rearward direction, from the retaining portion 35X, located near the forward end of the first lever half 25, rearward to around the pin hole 25D, where the release rod 35 curves downward, extending diagonally rearward.

[Connecting the Rod and Pawl]

The rearward end 35B of the release rod 35 is press formed with a generally L-shaped flat plate portion offset to the left to a depth substantially equal to the thickness of the pawl 37. From the right side surface of the end of the flat plate portion, a connecting protrusion 35C with a circular cross section extends to the right. The upper end of the pawl 37 includes a connecting hole 37B extending therethrough. The connecting protrusion 35C of the release rod 35 is inserted into the connecting hole 37B. The rearward end 35B of the release rod 35 and the upper end of the pawl 37 are thus rotatably connected.

[Anti-Rotating and Offset Sections of the Rod]

Further, the release rod 35 includes, slightly rearward of the retaining portion 35X, an anti-rotation section 35Y with a non-circular cross section that prevents the release rod 35 from rotation. The anti-rotation section 35Y faces the spring receiving portion 33A of the closure 33 when the retaining portion 35X is housed in the knob element 32. The forward end 35A of the release rod 35 thus includes the retaining portion 35X and the anti-rotation section 35Y. The anti-rotation section 35Y may be formed into the shape of a generally flat plate, for example, by pressing the release rod 35 partly. For example, the anti-rotation section 35Y may have a generally rectangular cross section elongate in the left-right direction.

Figure 5:
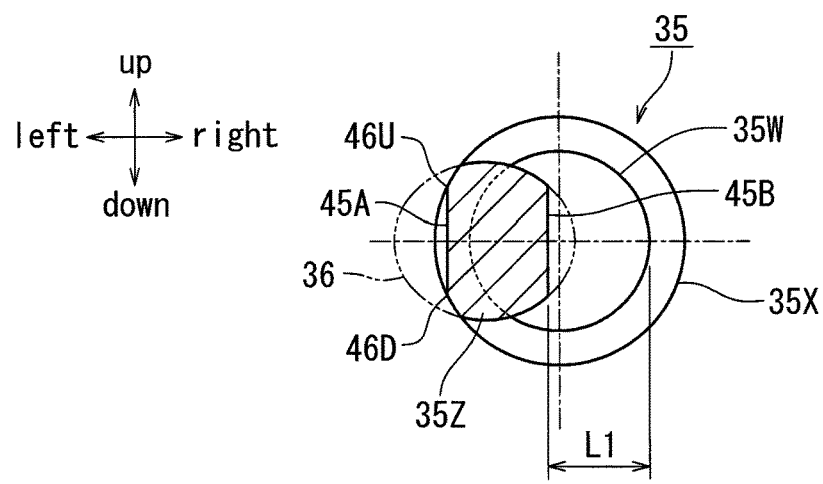
FIG. 5 is a cross-sectional view of the release rod of FIG. 4. taken along line V-V.
Figure 6:
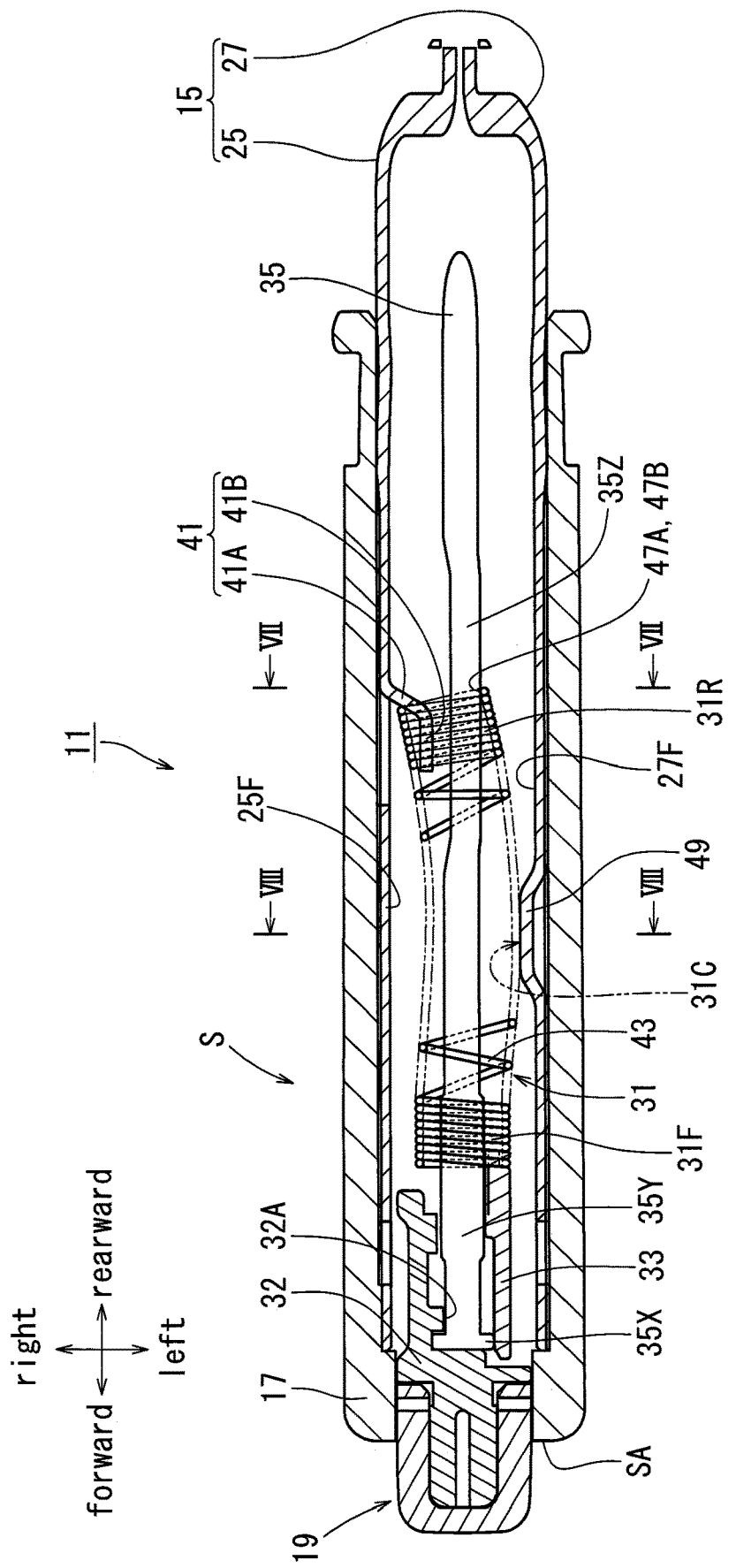
FIG. 6 is a cross-sectional view of the handle portion of the lever body of FIG. 1 taken along line VI-VI.

As shown in FIGS. 3, 5, and 6, the release rod 35 includes, slightly rearward of the anti-rotation section 35Y, an offset section 35Z having a length, offset to the left (away from the hook 41 described later). The center of the left-right width (i.e. distance from the left to right side surface) of the offset section 35Z is therefore to the left of the center line of the release rod 35. In FIG. 5, the center line of the non-offset sections 35W (including the retaining portion 35X) of the release rod 35 is located at the intersection of the dash-dotted lines. In particular, the right side surface of the offset section 35Z recedes, over the entire length of the offset section 35Z, from the right side surface of the non-offset sections 35W of the release rod 35 to the left (i.e. toward the second lever half 27) by a distance L1. The rearward end 31R of the compression coil spring 31 presses against the release rod 35 on the left side surface of the offset section 35Z. The release rod 35 can be positioned so that when it is attached to the release knob 19, the center line of the non-offset sections 35W (including the retaining portion 35X) coincides with the center axis of the release knob 19 which has a generally circular cross section.

As shown in FIGS. 4 to 7, the left side surface of the offset section 35Z of the release rod 35 may have upper and lower ridges 46U, 46D extending along the longitudinal direction of the release rod 35. The offset section 35Z may be formed into the shape of a generally flat plate by, for example, pressing the release rod 35 partly. For example, as shown in FIG. 5, the offset section 35Z may have a vertically elongate, generally rectangular cross section.

As a result, when contrasted with the non-offset section 35W having a circular cross section, the offset section 35Z includes on the left side a first flat surface 45A receding from an imaginary cylindrical surface 36 of the shape of a circular or elliptical cylinder. The offset section 35Z further includes on the right side a second flat surface 45B receding from the imaginary cylindrical surface 36. The ridges 46U and 46D are formed along the upper and lower edges of the first flat surface 45A on the left side of the offset section 35Z. The anti-rotation section 35Y and the offset section 35Z may be in such a relative position that the planes of their flat surfaces intersect perpendicularly.

[Support for the Rearward End of the Coil Spring]

As shown in FIGS. 2 and 6, the compression coil spring 31 is inserted over the release rod 35. The rearward end 31R of the compression coil spring 31 is supported by a spring holding portion formed on the half-tube portion 25F of the first lever half 25 constituting the handle portion S (see FIG. 1). The spring holding portion may be, for example, a hook 41 formed by cutting and raising the wall of the half-tube portion 25F inwardly into a generally L-shape or otherwise hook-like shape.

The hook 41 may be formed into a generally L-shape with a rising portion 41A extending inward from the half-tube portion 25F of the first lever half 25 and a straight portion 41B extending forward from the rising portion 41A. The straight portion 41B extends along the length direction of the half-tube portion 25F of the first lever half 25.

As shown in FIGS. 2 and 6, the compression coil spring 31 may be tightly wound at the forward and rearward ends 31F and 31R. The straight portion 41B of the hook 41 may have a length substantially the same as the length of the tightly wound section at the rearward end 31R of the compression coil spring 31. The intermediate section 31C of the compression coil spring 31 between the forward and rearward ends 31F, 31R may be wound so that the winding 43 (see FIG. 6) has gaps between turns when no load is applied to the compression coil spring 31 (that is, the spring is in an uncompressed state). The natural length of the compression coil spring 31, i.e. the length of the compression coil spring 31 in the uncompressed state is longer than the distance from the spring receiving portion 33A of the release knob 19 attached to the handle portion S (see FIG. 1) to the proximal end of the rising portion 41A of the hook 41.

[Assembly of the Rod and Knob]

The forward end 35A of the release rod 35, including the retaining portion 35X, is housed in the receptacle portion 32A of the knob element 32. As shown in FIG. 6, the retaining portion 35X of the release rod 35 is locked in the receptacle portion 32A of the knob element 32.

Further, as shown in FIGS. 2 and 6, a closure 33 is attached to the receptacle portion 32A of the knob element 32. During this attachment, the anti-rotation section 35Y of the forward end 35A of the release rod 35 housed in the receptacle portion 32A of the knob element 32 is fitted in and held by the generally slit-shaped insertion portion 33D formed in the spring receiving portion 33A of the closure 33 so as not to rotate about the axis. The forward end 35A of the release rod 35 is thus connected to the release knob 19 composed of the knob element 32 and the closure 33.

[Action of the Compression Coil Spring]

The forward end 31F of the compression coil spring 31 is attached to the spring receiving portion 33A of the release knob 19. The rearward end 31R of the compression coil spring 31 is held by the hook 41 on the first lever half 25. Since the natural length of the compression coil spring 31 is longer than the distance from the spring receiving portion 33A of the release knob 19 attached to the handle portion S to the proximal end of the rising portion 41A of the hook 41, the compression coil spring 31 is placed in a compressed state and produces a restoring force.

The restoring force of the compression coil spring 31 urges the release knob 19 and the release rod 35 forward. Through the release rod 35, the restoring force of the compression coil spring 31 urges the upper end of the pawl 37 in the direction that rotates it forward about the support pin P3, so that the claw portion 37C of the pawl 37 engages the teeth 39B of the ratchet gear 39.

[Structure of the Handle Portion of the Lever]

When subsequently the first lever half 25 and the second lever half 27 are coupled together, the half-tube portion 25F of the first lever half 25 and the half-tube portion 27F of the second lever half 27 are combined to form the forward end portion of the lever body 15, which corresponds to the handle portion S. When the grip element 17 is fitted over the forward end portion of the lever body 15, the release knob 19 protrudes from the forward end SA of the handle portion S, as shown in FIG. 1.

[Pressure by the Coil Spring]

Figure 7:
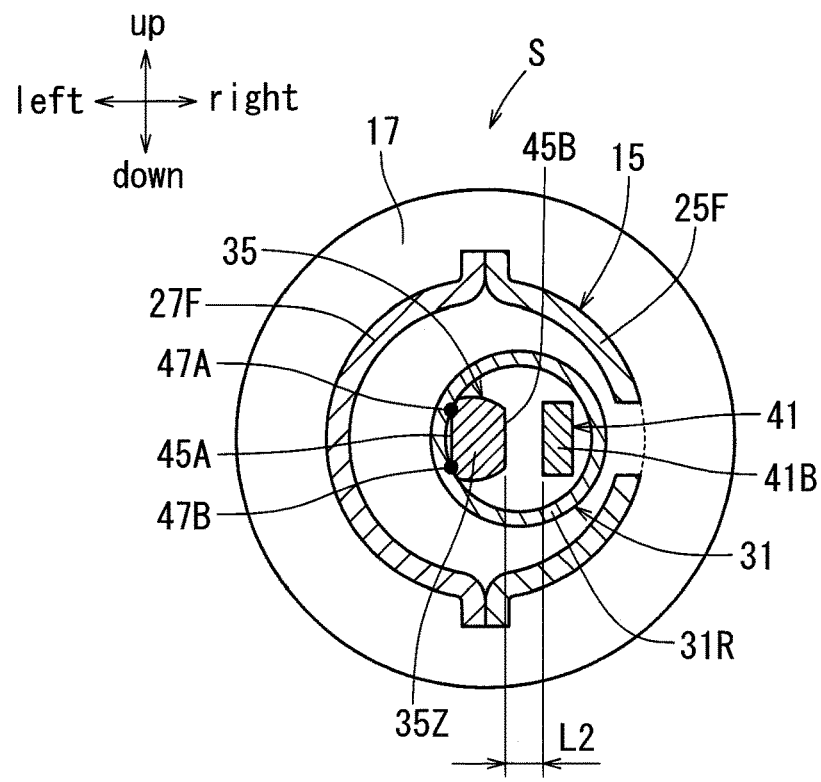
FIG. 7 is a cross-sectional view of the handle portion of the lever body of FIG. 6 taken along line VII-VII.

As shown in FIG. 6, while the right edge of the rearward end 31R of the compression coil spring 31 is stopped by the proximal end of the rising portion 41A of the hook 41, the left edge of the end 31R extends further rearward due to the restoring force, resulting in the rearward end 31R being tilted counterclockwise as seen in FIG. 6. As a result, as shown in FIGS. 6 and 7, the rearward end 31R of the compression coil spring 31 presses against the release rod 35 on the left side of the offset section 35Z. Therefore, at the rearward end 31R, the restoring force of the compression coil spring 31 acts not only on the hook 41 but also on the left side surface of the release rod 35. The compression coil spring 31 always presses against the offset section 35Z of the release rod 35 as the release rod 35 is moved forward and rearward by the operation of the release knob 19.

More specifically, as shown in FIG. 7, the rearward end 31R of the compression coil spring 31 presses, by its inner edge, against the offset section 35Z of the release rod 35 at the two contact points 47A, 47B on the ridges 46U, 46D on the left side surface. The second flat surface 45B on the right side of the offset section 35Z is separated from the straight portion 41B of the hook 41 by a distance L2.

Figure 8:
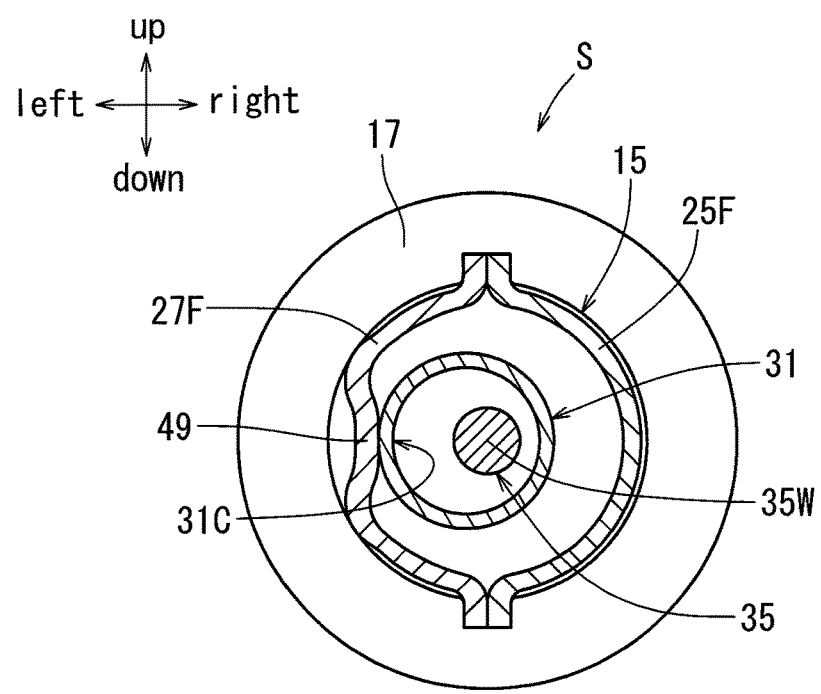
FIG. 8 is a cross-sectional view of the handle portion of the lever body of FIG. 6 taken along line VIII-VIII.

Further, as shown in FIGS. 2, 6 and 8, the forward end, half-tube portion 27F of the second lever half 27 includes an inwardly protruding portion 49, which is formed, for example, by pressing the flat surface facing the intermediate section 31C of the compression coil spring 31 so as to protrude inward in a rectangular shape elongated in the forward-rearward direction. As a result, as shown in FIGS. 6 and 8, the restoring force of the compression coil spring 31 causes its intermediate section 31C to be curved toward the left side of the compression coil spring 31 so that the intermediate section 31C rest on the protruding portion 49 that protrudes from the inner surface of the half-tube portion 27F.

[Operation of the Knob]

In the parking brake control device 11 configured as described above, when the driver presses the release knob 19, the release rod 35 is moved toward the pawl 37, causing it to pivot about the support pin P3 in the clockwise direction as seen in FIG. 2. This allows the claw portion 37C of the pawl 37 to be separated from the teeth 39B of the ratchet gear 39. As a result, the driver can operate the lever body 15 to rotate.

On the other hand, when the driver removes the pressure on the release knob 19, the release rod 35 moves toward the release knob 19, or forward, as the release knob 19 protrudes from the forward end SA of the handle portion S. This causes the pawl 37 to rotate about the support pin P3 in the counterclockwise direction as seen in FIG. 2 until the claw portion 37C of the pawl 37 engages the teeth 39B of the ratchet gear 39. As a result, the driver can hold the rotational position of the lever body 15.

[Assembly of the Control Device]

An example of the process of assembling the parking brake control device 11 will now be described. This assembling process generally includes arranging the release rod 35, the release knob 19, the compression coil spring 31, and other parts between the first lever half 25 and the second lever half 27.

The worker first place the first lever half 25, which constitutes the right side portion of the lever body 15, on a work table with the inner surface of the first lever half 25 facing upward. The compression coil spring 31 is inserted over the release rod 35 from the forward end 35A.

The worker then arranges the release rod 35 and the release knob 19 in specified positions on the first lever half 25 placed on the work table. Specifically, the knob element 32 constituting the release knob 19 is placed in the half-tube portion 25F of the first lever half 25 with the side opening of the receptacle portion 32A of the knob element 32 facing upward. The release rod 35 with the compression coil spring 31 inserted over it is placed in a specified position inside the first lever half 25. During this placement, the forward end 35A of the release rod 35 is fitted into the receptacle portion 32A of the knob element 32 placed on the first lever half 25 so that the retaining portion 35X is locked in the receptacle portion 32A.

Subsequently, the closure 33 constituting part of the release knob 19 is fitted from above to the receptacle portion 32A of the knob element 32. More specifically, for example, the insertion portion 33D of the closure 33 is inserted from above over the anti-rotation section 35Y extending out of the receptacle portion 32A of the knob element 32. The closure 33 is then fitted to the knob element 32 from above so as to cover the side opening of the receptacle portion 32A of the knob element 32. In this way the release knob 19 is assembled from the knob element 32 and the closure 33, and the forward end 35A of the release rod 35 is attached to the release knob 19. The anti-rotation section 35Y of the release rod 35 extends out of the insertion portion 33D of the closure 33.

Next, on the first lever half 25, the compression coil spring 31 inserted over the release rod 35 is fastened. More specifically, from above the first lever half 25 arranged on the work table, the worker attaches the forward end 31F of the compression coil spring 31 to the spring receiving portion 33A of the closure 33, and hooks the rearward end 31R of the compression coil spring 31 on the hook 41. As a result, the compression coil spring 31 becomes in an arcuate form with the intermediate section 31C of the compression coil spring 31 lifted upward (see FIG. 6). At the same time, the inner edge of the rearward end 31R of the compression coil spring 31 presses against the upper surface of the offset section 35Z of the release rod 35 (see FIG. 7).

The compression coil spring 31 is thus attached in a compressed state between the spring receiving portion 33A of the closure 33 and the hook 41 formed on the half-tube portion 25F of the first lever half 25 and, as a result, applies a restoring force to the release knob 19. At this time, as shown in FIG. 7, the lower surface of the offset section 35Z of the release rod 35 is kept separated a distance L2 from the straight portion 41B of the hook 41 formed on the half-tube portion 25F of the first lever half 25. This prevents the hook 41 of the first lever half 25 from hitting the release rod 35.

With the release rod 35, the release knob 19, and other parts thus arranged on the first lever half 25, the first lever half 25 is then covered on top with the second lever half 27. As a result, parts such as the release rod 35 are kept inside the first lever half 25 and the second lever half 27 of the parking brake control device 11. The second lever half 27 covers the first lever half 25, which has the release rod 35 and other parts attached on it, with its inner side facing downward. Therefore, as shown in FIGS. 6 and 8, the inwardly protruding portion 49 in the half-tube portion 27F of the second lever half 27 contacts the intermediate section 31C of the compression coil spring 31.

Although not described above, the pawl 37 and the base 13 to which the ratchet gear 39 has been fixed are arranged in place inside the first lever half 25 before the first lever half 25 is closed by the second lever half 27. These parts may be arranged either before or after the release rod 35, the release knob 19, and the compression coil spring 31 are arranged, provided they are arranged before the second lever half 27 covers.

With the parts such as the release rod 35 and the release knob 19 kept between the first lever half 25 and the second lever half 27, the support pins P1, P2, P3, P4 are clinched to complete the assembly of the parking brake control device 11.

[Advantages]

The parking brake control device 11 described above has the advantages listed below. The pressure of the rearward end 31R (i.e. the end opposite to the release knob 19) of the compression coil spring 31 against the rod-shaped release rod 35 reduces vibration of the release rod 35 generated when the brake is not applied or the vehicle is running at low cost, and thereby prevents generation of noise. The release rod 35 is formed with an offset section 35Z having a length offset away from the hook 41 in the position facing the hook 41. This configuration realizes the above-mentioned pressure of the compression coil spring 31 in a simple way, leading to a further cost reduction.

The parts such as the release knob 19 and the release rod 35 can be installed inside the cylindrical handle portion S of the lever body 15 by first arranging the release rod 35 and other parts on top of the half-tube portion 25F of the first lever half 25, and then covering the second lever half 27 from above. This improves the efficiency of the assembly work and reduces the manufacturing cost.

The load of the compression coil spring 31 is dispersed and therefore reduced, as the rearward end 31R of the compression coil spring 31 presses against the offset section 35Z of the release rod 35 at the two contact points 47A, 47B on the ridges 46U, 46D on the left side surface. This configuration reduces rubbing noise and wear of the offset section 35Z during operation of the release knob 19.

The right side surface of the offset section 35Z of the release rod 35 recedes, over the entire length of the offset section 35Z, to the left, or toward the inner surface of the second lever half 27, by a distance L1 with reference to the right side surface of the non-offset section 35W of the release rod 35 (see FIG. 5). This arrangement provides larger gap between the offset section 35Z of the release rod 35 and the straight portion 41B of the hook 41 facing the offset section 35Z and thereby more effectively prevents generation of the noise due to vibration of the release rod 35.

The protruding portion 49 in the half-tube portion 27F of the second lever half 27 touching the intermediate section 31C of the compression coil spring 31 reduces vibration of the compression coil spring 31, and thereby further reduces generation of rubbing noise from the release knob 19 in operation and of noise occurring when the vehicle is running.

Other Embodiments

Further embodiments of the present disclosure will be described below. In the following descriptions, the same reference numerals as those used for the parking brake control device 11 of the embodiments described with reference to FIGS. 1 to 8 indicate the similar or corresponding features as those of the parking brake control device 11 of those embodiments.

Figure 9:
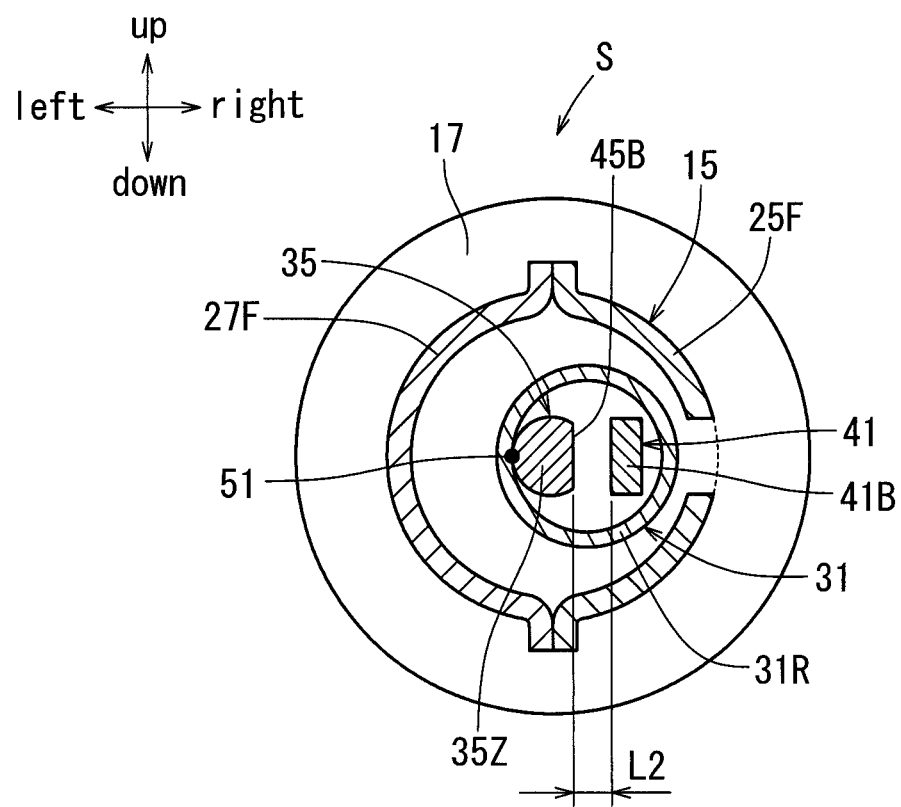
FIG. 9 is a schematic view of a release rod in contact with a compression coil spring, according to another embodiment.

(A) In another embodiment, as shown in FIG. 9, the offset section 35Z of the release rod 35 may have only the flat surface 45B on the right side of the offset section 35Z, with the left side of the offset section 35Z comprising a curved surface convex to the left. The cross section of the anti-rotation section 35Y and the flat surface 45B of the offset section 35Z are thus in such a relative position that their planes intersect perpendicularly. On the other hand, the right side of the offset section 35Z is recessed, over the entire length of the offset section 35Z, radially to the left from the right side surface of the non-offset sections 35W of the release rod 35 by a distance L1 (see FIG. 5).

As a result, as shown in FIG. 9, the rearward end 31R of the compression coil spring 31 presses against the release rod 35 at one contact point 51 on the left side surface of the offset section 35Z. On the other hand, the flat surface 45B on the right side of the offset section 35Z is sufficiently separated from the straight portion 41B of the hook 41 (by distance L2).

As a result, the rearward end 31R of the compression coil spring 31 presses against the release rod 35. This reduces vibration of the release rod 35 when the brake is not operated or the vehicle is running at low cost, and thereby prevents generation of noise. The release rod 35 is formed with an offset section 35Z having a length offset in a direction away from the hook 41 at a position facing the hook 41. This configuration realizes the above-mentioned pressure of the compression coil spring 31 in a simple way, leading to a further cost reduction.

(B) In the above embodiment The cross section of the offset section 35Z of the release rod 35 has been described has having a vertically elongated, generally rectangular shape; however, in another embodiment, either the first flat surface 45A or the second flat surface 45B may be press formed in an arc shape with a radius of curvature so as to project outward in the left-right direction. In this embodiment, the radius of curvature of the first flat surface 45A is preferably larger than the inner radius of the rearward end 31R of the compression coil spring 31.

As a result, when the end 31R of the compression coil spring 31 presses, at its inner edge, against the left side of the offset section 35Z of the release rod 35 at two contact points on upper and lower edges of the first flat surface 45A. This configuration reduces, at low cost, vibration of the release rod 35 when the brake is not applied or when the vehicle is running, and thereby prevents generation of noise. Further, the two vertically (or circumferentially) arranged edges of the first flat surface 45A contact the inside of the end 31R of the compression coil spring 31 on the opposite side to the release knob 19 at two contact points. This configuration disperses and therefore relieve the load of the compression coil spring 31, and thereby reduces rubbing noise and wear of the offset section 35Z during operation of the release knob 19.

(C) In another embodiment, the first flat surface 45A formed in the offset section 35Z of the release rod 35 may have a recess or a ridge in the form of a bead extending along the axial (or forward-rearward) direction. This enhances the bending strength of the offset section 35Z.

(D) In another embodiment, the release rod 35 may include a externally threaded section with some length at the forward end instead of the retaining portion 35X. Further, the release knob 19 may include an internally threaded portion about the central axis instead of the receptacle portion 32A. The externally threaded section formed at the end of the release rod 35 may be screwed into the internally threaded portion of the release knob 19 to be fastened.

(E) In another embodiment, the lever body 15 may include, instead of the release knob 19, a horizontal knob that presses from the left or right side in the vehicle width direction at the tip of the handle portion S of the lever body 15. Then, a cam mechanism may be included between the horizontal knob and the release rod 35 and configured so that pressing the horizontal knob in the vehicle width direction causes the release rod 35 to move in the forward-rearward direction.

With this configuration, when the driver presses the horizontal knob in the vehicle width direction, the release rod 35 moves to the pawl 37 side, and the claw portion 37C of the pawl 37 is separated from the teeth 39B of the ratchet gear 39. As a result, the driver can operate the lever body 15 to rotate. On the other hand, when the driver removes the pressure on the horizontal knob in the vehicle width direction, the release rod 35 moves forward, and the claw portion 37C of the pawl 37 engages the teeth 39B of the ratchet gear 39. As a result, the driver can hold the rotational position of the lever body 15.

(F) In the above embodiment, the ratchet gear 39 and the base 13 have been described as separately prepared, and coupled by clinching the protrusion 39A of the ratchet gear 39 into the notch 13C of the base 13; however, in another embodiment, the teeth 39B may be formed directly along a circular periphery of the base 13. As a result, the number of parts can be reduced.

(G) The axial lengths of the two ends 31F, 31R of the compression coil spring 31 may be the same or different.

Advantages of Various Embodiments

In at least one aspect of the present disclosure, the pressure of the end of the compression coil spring opposite to the release knob against the release rod reduces, at low cost, vibration of the release rod when the brake is not applied or the vehicle is running, and thereby prevents generation of noise. In some embodiments, the release rod includes an offset section having a length offset away from the spring holding portion at the position facing the spring holding portion. This configuration realizes the above-mentioned pressure of the compression coil spring in a simple way, leading to a further cost reduction.

In some embodiments, parts such as the release rod can be installed inside the tubular handle portion of the lever body by first attaching those parts on the half-tube portion of one lever half and then covering them with the other lever half. This improves the efficiency of assembly work and reduces the manufacturing cost. In some embodiments, the two circumferentially arranged edges of the first flat surface of the offset section contact the inner edge of the end of the compression coil spring. This arrangement disperses and therefore reduces the load of the compression coil spring, and thereby reduces the rubbing noise and the wear of the offset section when the release knob operates.

In some embodiments, a larger gap is provided between the offset section and the spring holding portion facing the second plane portion of the offset section. This prevents generation of noise due to the vibration of the release rod more effectively. In some embodiments, the inwardly protruding portion protruding from the inner surface of the half-tube portion of the other lever half touches the axial center portion of the compression coil spring. This reduces vibration of the compression coil spring, and thereby further reduce the rubbing noise generated by the release knob in operation, and noise generated when the vehicle is running.

While various specific embodiments have been described above, the present disclosure is not limited to these embodiments, and various improvements, modifications, additions, and deletions that suggest to those skilled in the art may of course be possible.

The invention claimed is:

1. A parking brake control device, comprising:
a base configured to be attached to a vehicle body;
a lever body rotatable with respect to the base and comprising a tubular handle portion;
a ratchet gear formed on the base;
a pawl rotatable with respect to the lever body and engaging with the ratchet gear to regulate rotation of the lever body;
a release knob protruding from an end of the handle portion;
a compression coil spring positioned inside the handle portion, the spring having a first end and a second end, wherein the compression coil spring at the first end urges the release knob outward of the handle portion; and
a release rod inserted through the compression coil spring, with one end attached to the release knob, and another end connected to the pawl,
wherein pushing in the release knob causes the release rod to rotate the pawl to disengage from the ratchet gear, and
wherein the compression coil spring always presses at the second end against a side surface of the release rod as the release rod moves forward and rearward by operation of the release knob.

2. The parking brake control device of claim 1, wherein:
the lever body comprises a spring holding portion on the inner surface of the handle portion to support the second end of the compression coil spring; and
the release rod comprises an offset section having a length in a position facing the spring holding portion, the offset section being offset in a direction away from the spring holding portion, and the compression coil spring presses at the second end against the side surface of the offset section of the release rod.

3. The parking brake control device of claim 2, wherein:
the lever body comprises a pair of lever halves coupled together, the lever halves being divided in the rotation axis direction, one lever half comprising a first half-tube portion and the other lever half comprising a second half-tube portion, the first and second half-tube portion together forming part of the handle portion;
the spring holding portion is formed on an inner surface of the first half-tube portion; and
the offset section of the release rod is offset toward the second half-tube portion.

4. The parking brake control device of claim 3, wherein:
the second half-tube portion comprises an inwardly protruding portion; and
an intermediate section of the compression coil spring rests on the protruding portion.

5. The parking brake control device of claim 1, wherein:
the release rod comprises a first flat surface portion in the side surface.

6. The parking brake control device of claim 5, wherein:
the release rod further comprises a recessed second flat surface portion opposite to the first flat surface portion.

7. The parking brake control device of claim 1, wherein:
the release rod further comprises two ridges in the side surface, and the compression coil spring presses against the release rod at the two ridges.

8. A parking brake control device, comprising:
a base configured to be attached to a vehicle body;
a lever body rotatable with respect to the base and comprising a tubular handle portion;
a ratchet gear formed on the base;
a pawl rotatable with respect to the lever body and engaging with the ratchet gear to regulate rotation of the lever body;
a release knob protruding from an end of the handle portion;
a compression coil spring positioned inside the handle portion, the spring having a first end and a second end,
wherein the compression coil spring at the first end urges the release knob outward of the handle portion; and
a release rod inserted through the compression coil spring, with one end attached to the release knob, and another end connected to the pawl,
wherein pushing in the release knob causes the release rod to rotate the pawl to disengage from the ratchet gear, and
wherein the release rod comprises (i) an offset section and (ii) non-offset sections adjacent to the offset section, a longitudinal center line of the offset section being offset from a longitudinal center line of the non-offset sections, and the compression coil spring presses at the second end against a side surface of the offset section of the release rod.

9. A parking brake control device, comprising:
a base configured to be attached to a vehicle body;
a lever body rotatable with respect to the base and comprising a tubular handle portion;
a ratchet gear formed on the base;
a pawl rotatable with respect to the lever body and engaging with the ratchet gear to regulate rotation of the lever body;
a release knob protruding from an end of the handle portion;
a compression coil spring positioned inside the handle portion, the spring having a first end and a second end,
wherein the compression coil spring at the first end urges the release knob outward of the handle portion; and
a release rod inserted through the compression coil spring, with one end attached to the release knob, and another end connected to the pawl,
wherein pushing in the release knob causes the release rod to rotate the pawl to disengage from the ratchet gear,
wherein the compression coil spring presses at the second end against a side surface of the release rod, and
wherein the lever body comprises an inwardly protruding portion, and an intermediate section of the compression coil spring rests on the protruding portion.

* * * * *